US011594227B2

(12) United States Patent
Hermanns et al.

(10) Patent No.: US 11,594,227 B2
(45) Date of Patent: Feb. 28, 2023

(54) COMPUTER-IMPLEMENTED METHOD OF TRANSCRIBING AN AUDIO STREAM AND TRANSCRIPTION MECHANISM

(71) Applicant: Unify Patente GmbH & Co. KG, Munich (DE)

(72) Inventors: Lars Hermanns, Simmerath (DE); Thomas Nass, Hürth (DE); Stefan Moers, Baesweiler (DE); Frank Reif, Aachen (DE)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/354,455

(22) Filed: Jun. 22, 2021

(65) Prior Publication Data

US 2021/0407515 A1 Dec. 30, 2021

(30) Foreign Application Priority Data

Jun. 24, 2020 (EP) .................................... 20182036

(51) Int. Cl.

| | |
|---|---|
| ***G10L 15/26*** | (2006.01) |
| ***G06V 30/148*** | (2022.01) |
| ***G06K 9/62*** | (2022.01) |
| ***H04N 7/15*** | (2006.01) |

(52) U.S. Cl.

CPC ............ *G10L 15/26* (2013.01); *G06K 9/6201* (2013.01); *G06V 30/153* (2022.01); *H04N 7/15* (2013.01)

(58) Field of Classification Search

CPC ....... G10L 15/26; G10L 15/32; G06K 9/6201; G06V 30/153; H04N 7/15

See application file for complete search history.

(56) References Cited

U.S. PATENT DOCUMENTS

| | | | | |
|---|---|---|---|---|
| 3,041,565 | A1 | 10/2011 | Bhardwaj et al. | |
| 10,192,554 | B1 | 1/2019 | Boehme et al. | |
| 2002/0129012 | A1* | 9/2002 | Green .................. | G06F 16/313 707/E17.084 |
| 2012/0016671 | A1 | 1/2012 | Jaggi et al. | |
| 2019/0312973 | A1* | 10/2019 | Engelke ............ | H04M 1/72433 |
| 2020/0175987 | A1 | 6/2020 | Thomson et al. | |

* cited by examiner

*Primary Examiner* — Stella L. Woo

(74) *Attorney, Agent, or Firm* — Buchanan Ingersoll & Rooney PC

(57) ABSTRACT

A computer-implemented method of transcribing an audio stream can include transcribing the audio stream using a first transcribing instance having a first predetermined transcription size that is smaller than the total length of the audio stream. The first transcribing instance can provide a plurality of consecutive first transcribed text data snippets of the audio stream and the size of the first transcribed text data snippets can respectively corresponding to the first predetermined transcription size. The audio stream can also be transcribed using at least a second transcribing instance having a second predetermined transcription size that is smaller than the length of the audio stream. The second transcribing instance can provide a plurality of consecutive second transcribed text data snippets each corresponding to the second predetermined transcription size.

18 Claims, 8 Drawing Sheets

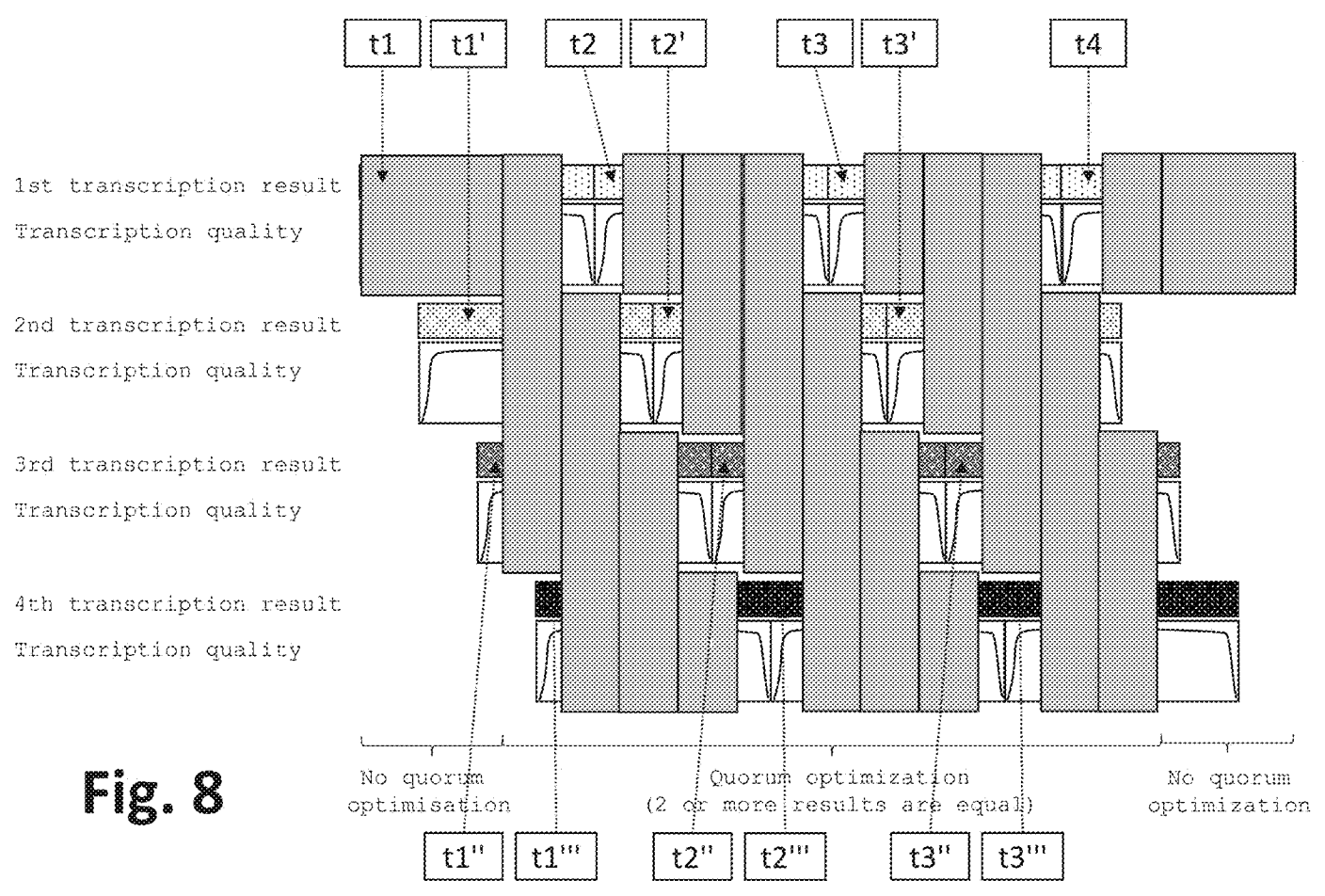

1st transcription result
Transcription quality
2nd transcription result
Transcription quality
3rd transcription result
Transcription quality
4th transcription result
Transcription quality t1
t1'
t2
t2'
t3
t3'
t4
t1''
t1'''
t2''
t2'''
t3''
t3'''

No quorum optimisation
Quorum optimization (2 or more results are equal)
No quorum optimization

Fig. 8

COMPUTER-IMPLEMENTED METHOD OF TRANSCRIBING AN AUDIO STREAM AND TRANSCRIPTION MECHANISM

CROSS-REFERENCE TO RELATED APPLICATIONS

The present application claims priority to European Patent Application No. EP 20 182 036.2, filed on Jun. 24, 2020. The entirety of this European Patent application is incorporated by reference herein.

FIELD

The present invention relates to a computer-implemented method of transcribing an audio stream and transcription mechanism implemented in a communication system for carrying out the method of transcribing an audio stream.

BACKGROUND

In prior art, transcription services are known which convert speech, either in real-time (real-time transcribing services as a first category) or recorded speech data (non real-time transcribing services as a second category), into written form or an electronic text document. The first category of transcribing services offers an Application Programming Interface, API, for transcribing an active audio stream, whereas transcription services of the second category offer an API for uploading previously recorded audio files.

For example, such transcribing services may be utilized for the purpose of real-time transcription of audio/video conferences, but just as well for 1-to-1. In this context, the expectation is that the conversation between the participants of a conference or a call is transcribed in real-time and displayed to the participants with as less delay as possible.

SUMMARY

We determined that the transcribing services known from prior art which may be used for the above described purposes usually are only able to transcribe short phrases of audio, typically less than a minute, for example, a voice command uttered by a user, as implemented, for example, in Alexa or Siri Digital Assistants, DA. Therefore, there exists a limit with respect to the transcription size for the length of an audio stream to be transcribed. Thus, if a participant of a conference call talks longer than this limit, for instance as a conference participant is performing a PowerPoint presentation, no transcription will be available for the time exceeding this limit.

Solutions known from prior art which aim at overcoming the above limitation, for example, stop and restart the transcription service for the audio stream before the transcription service limit is reached, thereby creating chunks of transcriptions. However, this has a very negative effect on the transcription quality, since words at the beginning and the end of the transcription may get cut-off. In addition, since the context of what was said before and after the chunk is not available, this will also result in a quality degradation of the transcription.

Also, utilizing a non real-time transcribing service for this purpose bears the same disadvantages: The recording has to be interrupted and sent to the transcription service, which asynchronously returns a result for the purpose of getting kind of a real-time feedback to the conference participants. Again, interrupting a recording has a very negative effect on the transcription quality, since words at the beginning and the end of the transcription get cut-off. In addition, since the context of what was said before and after the chunk is not available, this will also result in a quality degradation of the transcription.

Further, according to prior art, algorithms like silence detection may be applied in order to try to overcome the problem concerning cut-off words in both scenarios, at least to a certain extent, but the quality degradation due to missing context remains. In addition, this mechanism strongly depends on the speaker, the language and the environment, in order to properly detect silence (pauses) in the audio stream. Another issue is the sluggishness of this procedure: Detecting a meaningful phrase of silence, stopping and restarting a transcription service on the audio stream may result in words or phrases not being transcribed.

Thus, we have determined that there exists a problem in providing a transcription mechanism that overcomes the above described problems. Embodiments of the present invention can be based on the object to provide a computer-implemented method of transcribing an audio stream and a corresponding transcription mechanism that may use a transcription service that only transcribes audio data for a time period that is shorter than the entire audio stream or recorded speech, but that nevertheless outputs transcribed text of the entire audio stream or recorded speech with high transcription quality.

A computer-implemented method of transcribing an audio stream, in particular, during an audio- and/or video-conference, using a transcription service, can include:

transcribing the audio stream using a first transcribing instance of the transcription service, the first transcribing instance having a first predetermined transcription size that is smaller than the total length of the audio stream, the first transcribing instance providing a plurality of consecutive first transcribed text data snippets of the audio stream, the size of the first transcribed text data snippets respectively corresponding to the first predetermined transcription size; and transcribing the audio stream using at least a second transcribing instance, the second transcribing instance having a second predetermined transcription size that is smaller than the length of the audio stream, the second transcribing instance providing a plurality of consecutive second transcribed text data snippets of the audio stream, the size of the second transcribed text data snippets respectively corresponding to the second predetermined transcription size.

The first transcribing instance can start transcription of the audio stream at a first point of time and the second transcribing instance can start transcription of the audio stream at a second point of time with a predetermined delay with respect to the first transcribing instance. The predetermined delay can be selected such that each one of the plurality of second text data snippets respectively overlaps at least a portion at which a first transcribed text data snippet of the plurality of the first text data snippets ends and a consecutive first transcribed text data snippet of the plurality of the first text data snippets starts.

In embodiments of the method, transcription services may be used that only transcribe audio data of an audio stream for a time period that is shorter than the entire audio stream or recorded speech. However, due to the use of at least two transcribing instances with a certain overlap, a high transcription quality can be achieved.

According to an embodiment of the invention, the method can also include transcribing the audio stream using a third transcribing instance. The third transcribing instance can have a third predetermined transcription size that is smaller than the total length of the audio stream. The third transcribing instance can provide a plurality of consecutive third transcribed text data snippets of the audio stream. The size of the third transcribed text data snippets respectively corresponding to the third predetermined transcription size. The third transcribing instance can start transcription of the audio stream at a second point of time with a predetermined delay with respect to the second transcribing instance. The predetermined delay can be selected such that each one of the plurality of third text data snippets respectively overlaps at least a portion at which a first transcribed text data snippet of the plurality of the first text data snippets ends and a consecutive first transcribed text data snippet of the plurality of the first text data snippets starts. By using a third transcribing instance which starts with another certain delay or overlap, the transcription quality may be even further improved.

According to another embodiment of the invention, the transcription size of the first, second, and third transcription instances is equal.

Further, the transcription service may be a real-time transcription service, in particular, an Automatic Speech Recognition, ASR, service, which uses real-time transcription instances.

Alternatively, the transcription service may also be a non real-time transcription service.

According to another preferred embodiment of the invention, the method can also include concatenating the first, second, and third transcribed text data snippets. In some embodiments, concatenating the first, second, and third transcribed text data snippets can include identifying matching text passages in overlapping portions of the first, second, and third transcribed text data snippets. Preferably, the identifying matching text passages includes identifying at least one word having a predetermined minimum length (e.g. at least 14 characters in length, 5-14 characters in length, at least 10 characters in length, etc.) in the first transcribed text data snippet. If the at least one word having the predetermined minimum length is identified in the first transcribed text data snippet, searching for the identified at least one word in the second transcribed text data snippet can also be performed. If the at least one word having the predetermined minimum length is identified in the first transcribed text data snippet, searching for the identified at least one word in the third transcribed text data snippet can also be performed.

Preferably, the step of identifying matching text passages includes identifying at least one word pattern in the first transcribed text data snippet. The at least one word pattern can include at least two long words with a predetermined number of short words in between the two long words in some embodiments. If the at least one word pattern is identified in the first transcribed text data snippet, searching for the identified at least one word pattern in the second transcribed text data snippet, and/or in the third transcribed text data snippet can be performed.

In some embodiments, identifying matching text passages can include identifying at least one syllable pattern according to a Porter-Stemmer algorithm in the first transcribed text data snippet. If the at least one syllable pattern is identified in the first transcribed text data snippet, searching for the identified at least one syllable pattern in the second transcribed text data snippet and/or in the third transcribed text data snippet can be performed. Preferably, the identified matching words and/or text passages are correlated.

According to yet another preferred embodiment of the invention, the transcribed audio stream is displayed at a display means (e.g. a liquid crystal display, a monitor, a television, a display, etc.).

A transcription mechanism for a communication system for carrying out a video and/or audio conference with at least two participants is also provided. The transcription mechanism can be adapted to carry out the method described above and can be incorporated into a communication network and/or a communication system. In some embodiments, the transcription mechanism can be a function of a communication server hosting a service for a telecommunication conference. In other embodiments, the transcription mechanism can be a transcription device that is communicatively connected to such a server or unit of servers. The communication server can be a computer device that includes a processor connected to a non-transitory computer readable medium (e.g. memory, flash memory, a hard drive, etc.).

Other details, objects, and advantages of the telecommunication method, computer device, telecommunications apparatus, system, device, and methods of making and using the same will become apparent as the following description of certain exemplary embodiments thereof proceeds.

BRIEF DESCRIPTION OF THE DRAWINGS

The invention and embodiments thereof will be described below in further detail in connection with the drawings. It should be understood that like reference characters used in the drawings may identify like components.

FIG. 8 illustrates an exemplary optimization procedure with four transcription instances according to an embodiment of the invention.

Figure 1:
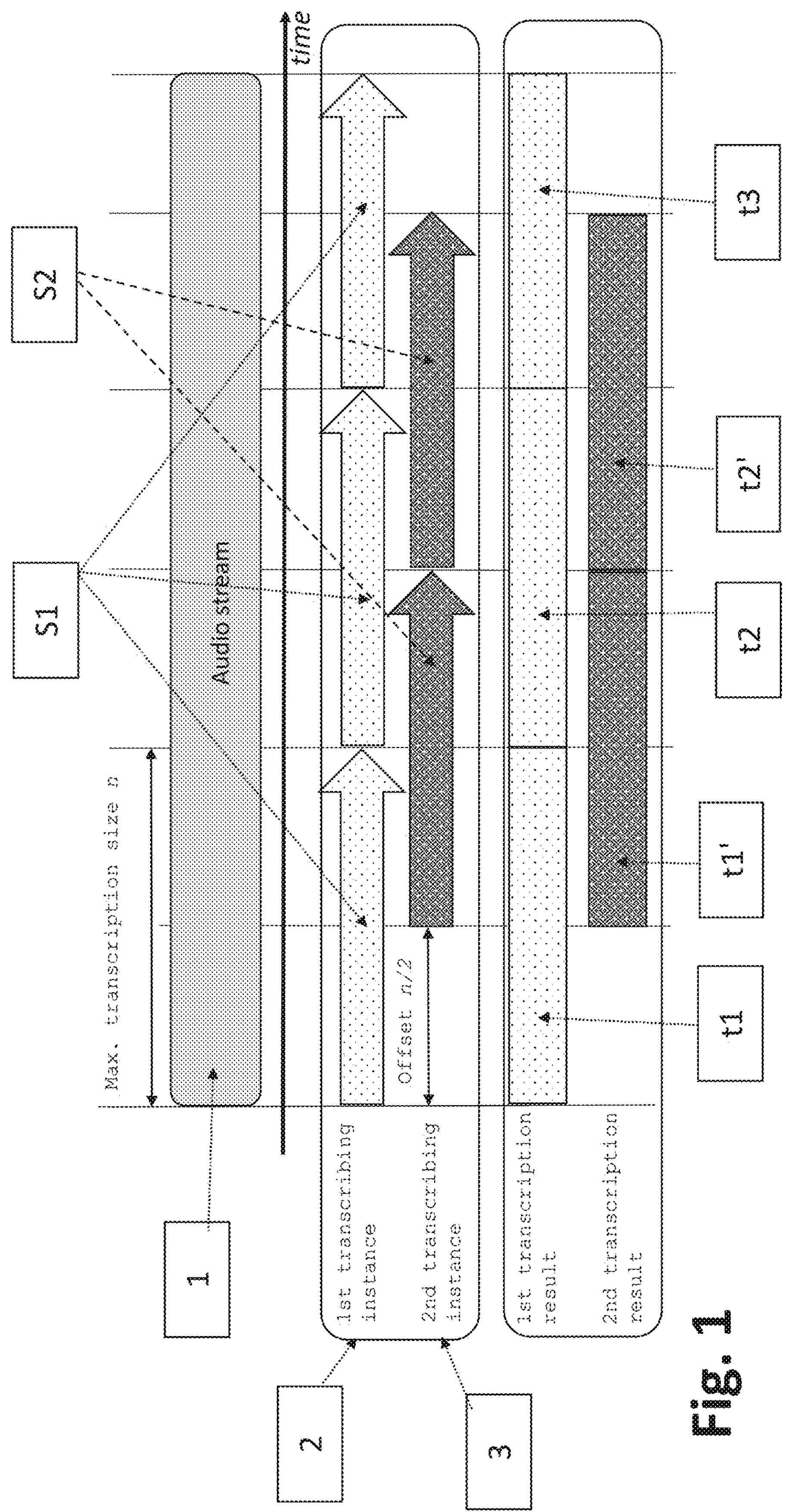
FIG. 1 schematically illustrates an exemplary long time audio stream being transcribed by two transcribing instances according to an embodiment of the invention.

Reference numerals used in the drawings include:

1—audio stream;

2—first transcribing instance;

3—second transcribing instance;

4—third transcribing instance;

5—fourth transcribing instance;

S1, S2, S3—transcription sizes; and t1-t3"—different transcribed text data snippets.

DETAILED DESCRIPTION

FIG. 1 schematically illustrates a long time audio stream 1 being transcribed by two transcribing instances according to an embodiment of the invention. According to the embodiments described in the following, real-time transcription services are described. However, it is noted that the same methodology may be applied to non real-time transcription services as well. Namely, as can be seen in FIG. 1, a first transcribing instance 2 and a second transcribing instance 3 can be used for transcribing the audio stream 1, wherein the first transcribing instance 2 has a first predetermined transcription size s1 that is smaller than length of the entire audio stream 1 to be transcribed. During the transcription procedure, the first transcribing instance 2 provides a plurality of consecutive first transcribed text data snippets t1, t2, t3 of the audio stream 1, whereby the size of the first transcribed text data snippets t1, t2, t3 respectively corresponds to the first predetermined transcription size S1.

Further, the second transcribing instance 3 has a second predetermined transcription size S2, which in the embodiment shown here is equal to the first predetermined transcription size S1 of the first transcribing instance 2. However, it is also conceivable that the first and second transcription sizes S1, S2 may vary and are not equal. Also, the second transcription size S2 can be smaller than the size of the entire audio stream 1 to be transcribed. The second transcribing instance 3 can provide a further plurality of consecutive second transcribed text data snippets t1', t2' of the audio stream 1, wherein the size of the second transcribed text data snippets t1', t2' respectively corresponds to the second predetermined transcription size S2.

As can be seen in the figure, the first and second transcription instances 2, 3 start transcription with a certain delay so that an overlap results. Namely, the first transcribing instance 2 starts transcription of the audio stream 1 at a first point of time and the second transcribing instance 3 starts transcription of the audio stream 1 at a second point of time with a predetermined delay with respect to the first transcribing instance, wherein the predetermined delay is selected such that each one of the plurality of second text data snippets t'1, t'2 respectively overlaps at least a portion at which a first transcribed text data snippet t1 of the plurality of the first text data snippets ends and a consecutive first transcribed text data snippet t2 of the plurality of the first text data snippets starts. For example, the transcription delay for the second transcription instance can be selected so that a snippet of the second transcribing instance 3 overlaps with at least an ending portion of a first snippet of the plurality of the first text data snippets and also overlaps with a starting portion of a second snippet of the plurality of the first text data snippets that is subsequent to and consecutively after the first snippet of the first text data snippets.

Figure 2:
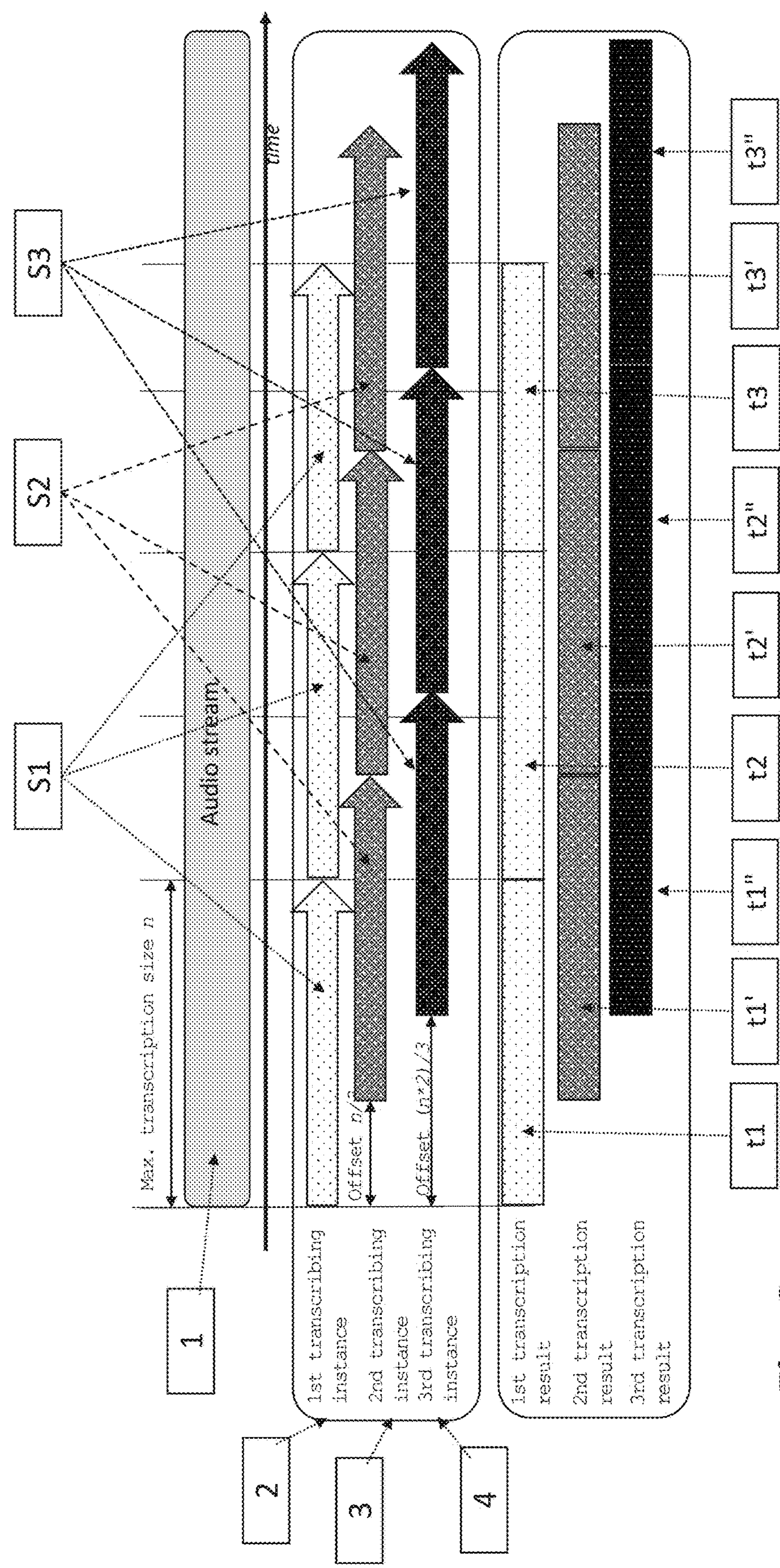
FIG. 2 schematically illustrates an exemplary long time audio stream being transcribed by three transcribing instances according to an embodiment of the invention.

FIG. 2 schematically illustrates a long time audio stream 1 being transcribed by three transcribing instances according to an embodiment of the invention. This embodiment differs from the one shown in FIG. 1 in that additionally, a third transcribing instance 4 is used for transcribing the audio stream 1. Also, the third transcribing instance has a third predetermined transcription size S3 that is smaller than the size of the entire audio stream 1 to be transcribed. The third transcribing instance 4 provides a further plurality of consecutive third transcribed text data snippets t1", t2", t3" of the audio stream 1. The third transcribing instance 4 starts transcription of the audio stream 1 at a second point of time with a predetermined delay or offset with respect to the second transcribing instance 3 such that each one of the plurality of third text data snippets t1", t2", t3" respectively overlaps at least the portion at which a first transcribed text data snippet of the plurality of the first text data snippets ends and a consecutive first transcribed text data snippet of the plurality of the first text data snippets starts, as already outlined with respect to FIG. 1. For example, the transcription delay for the third transcribing instance can be selected so that a snippet of the third transcribing instance 3 overlaps with at least an ending portion of a first snippet of the plurality of the first text data snippets and also overlaps with a starting portion of a second snippet of the plurality of the first text data snippets that is subsequent to and consecutively after the first snippet of the first text data snippets.

Figure 3:
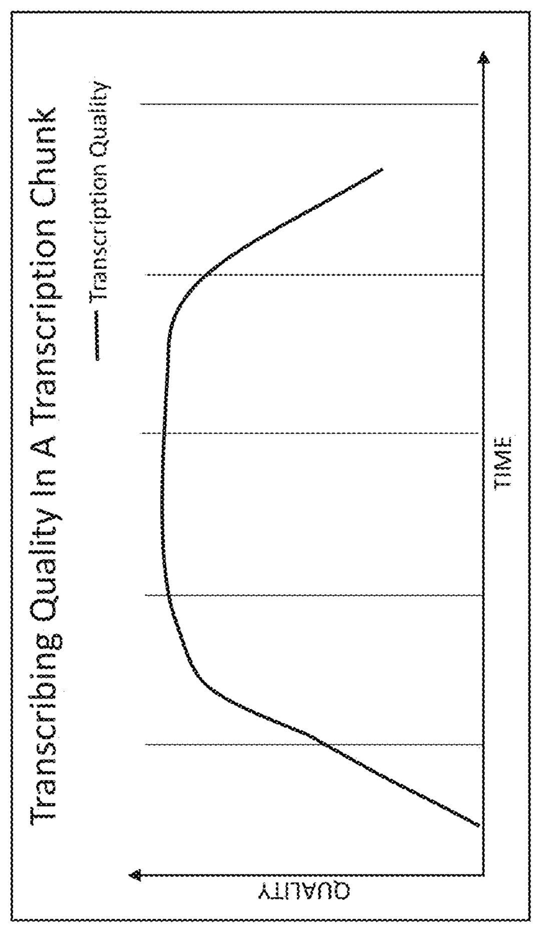
FIG. 3 illustrates an exemplary development of the transcription quality in a typical transcription chunk.

FIG. 3 illustrates an exemplary process for the development of the transcription quality in a typical transcription chunk, for example, a transcription chunk created by the first transcribing instance 2 described with respect to FIG. 1 and FIG. 2, which has a predetermined transcription size S1 or length or duration. It can be seen that the quality within the separate transcription chunks varies due to eventually cut-off words at the beginning and the end of transcription. Moreover, no context (i.e., context concerning the audio to be described) will be available at the beginning of the transcribing process. Context will be created over time within the transcription engine and the more context is available, the more accurate the transcription will be. Thus, the best quality is achieved in the middle part of a transcription chunk.

Figure 4:
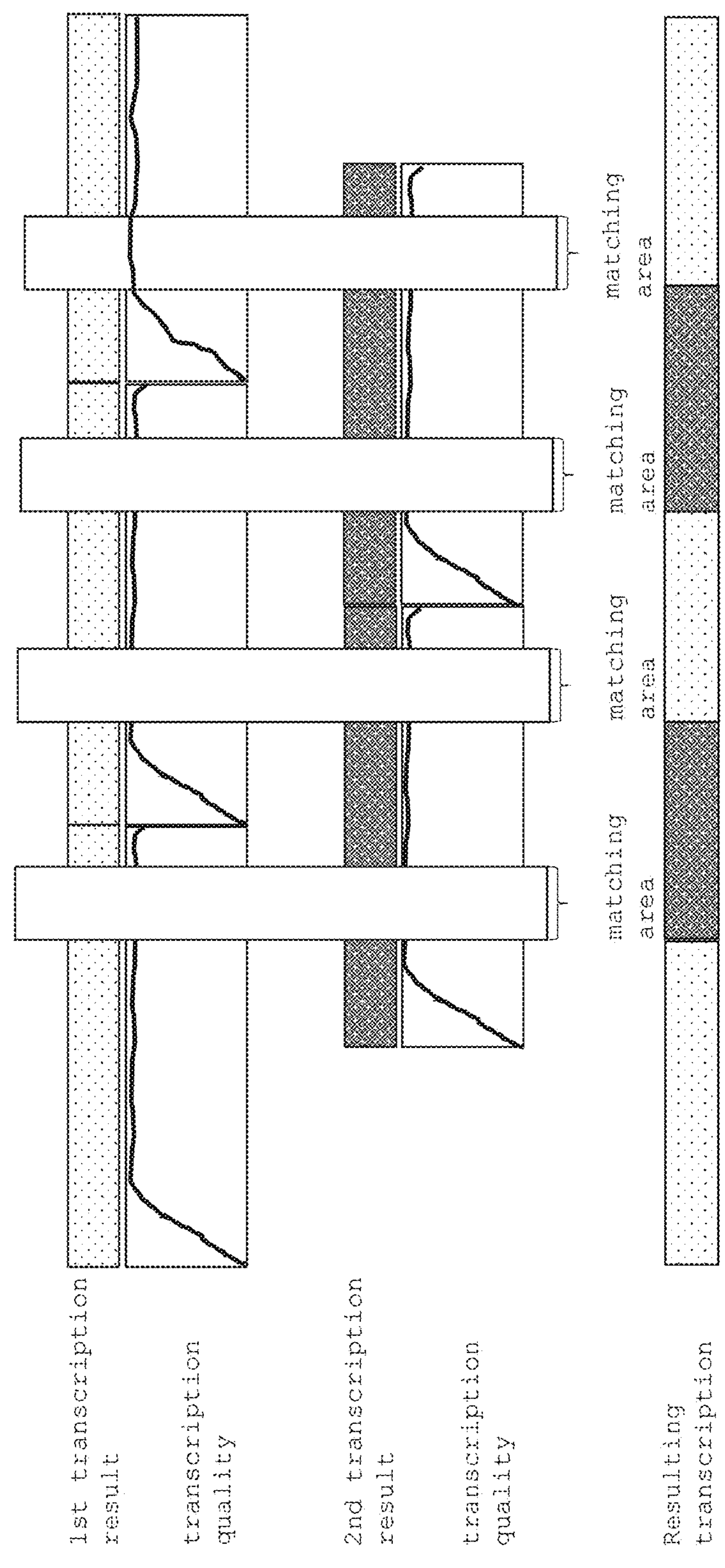
FIG. 4 illustrates an exemplary concatenation procedure of transcription chunks according to an embodiment of the invention.

FIG. 4 illustrates an exemplary concatenation procedure of transcription chunks according to an embodiment of the invention. Namely, according to the embodiment shown here, the first transcribing instance 2 has provided a first transcription result with a first transcription quality reflected in the first transcribed text data snippet t1, as described with respect to FIG. 3. The same applies for the second transcribing instance 3 that has provided a second transcription result with a second transcription quality reflected in the second transcribed text data snippet t1'.

When concatenating the text data snippets t1, t1', matching text passages need to be identified. As already outlined with respect to FIG. 3, since cut-off words occur at the beginning and at the end of a snippet and due to missing context, a transcription chunk consists of areas of lower and higher quality. For the combined, resp. aggregated transcription, only areas of high quality within both transcription chunks are used. This is done by matching text from the "matching area" from the second transcription result with the "matching area" from the first transcription result. The matching area is initially defined with fixed starting values, which are iteratively modified to find matching text passages.

Figure 5:
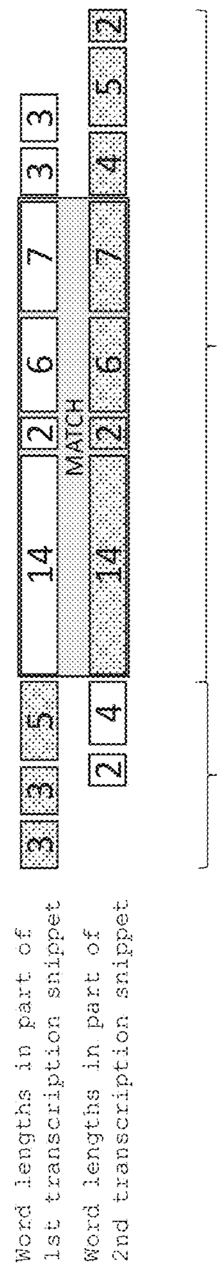
FIG. 5 illustrates an exemplary first matching procedure according to an embodiment of the invention.

FIG. 5 illustrates an exemplary first matching procedure according to an embodiment of the invention. This embodiment refers to a word length matching procedure using the first transcription until match found, then the second transcription. The transcription engines generally recognize words with a certain minimum length (e.g. 14 characters, 12 characters, 4-14 characters, 4-12 characters, at least 14 characters, at least 10 characters, etc.) with a higher confidence than shorter words. Consequently, the algorithm will start to find those words in the matching area of the first text data snippet 1. If a word of this length is available, it will search for this word in the matching area of the snippet t1. In addition, words with a certain length appear less frequently in typical speech. As a consequence, if a long word is found in both snippets t1, t1', it is very likely that these words can be used to match the snippets.

Figure 6:
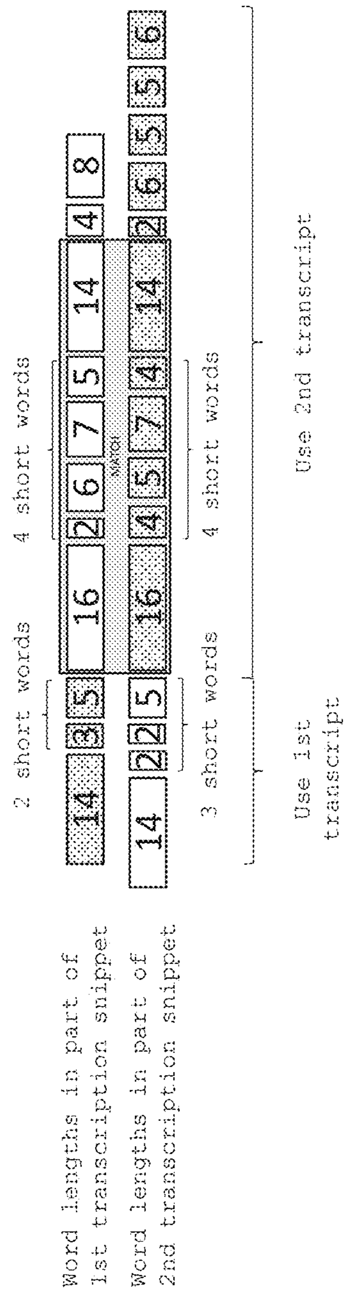
FIG. 6 illustrates an exemplary second matching procedure according to another embodiment of the invention.

FIG. 6 illustrates an exemplary second matching procedure according to another embodiment of the invention. Here, a matching optimization can be achieved by using word patterns, for example, the matching on count of short words between long words. This is a variant of the 'optimization by word length' described with respect to FIG. 5.

In addition, it takes into consideration, that eventually a short word is not recognized with the same high confidence as a long word, at least it is recognized as one word. Thus, the number of short words can be used as well. Concretely, the method looks for two (or more) long words in the first text data snippet t1 and counts the number of shorter words between the long words. In case both long words and the number of short words in between do match, it is very likely that this word pattern can be used to match both text data snippets t1, t1'. In some embodiments, a long word can be a word that has at least 8 characters (e.g. at least 8 letters), at least 10 characters, at least 12 characters, or at least 14 characters and a short work can be a word that has less than 6 characters (e.g. at most 5 letters), less than 5 characters (e.g. at most 4 letters), or less than 4 characters (e.g. at most 3 letters).

Figure 7:
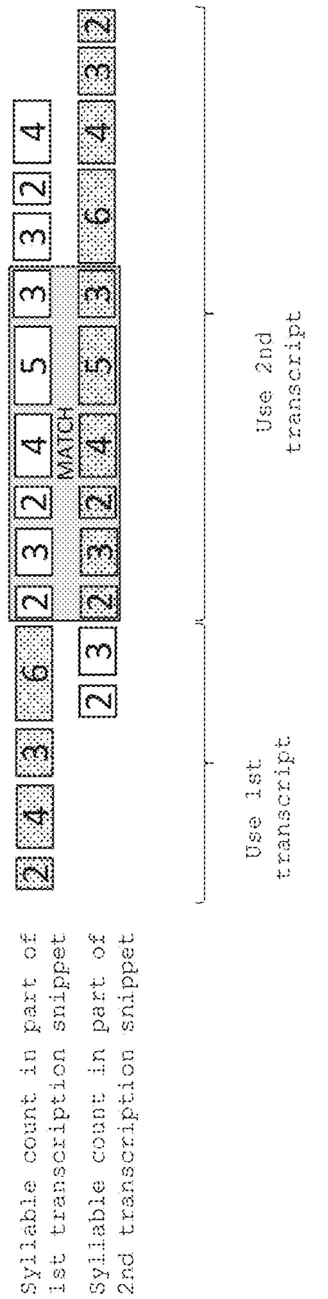
FIG. 7 illustrates an exemplary third matching procedure according to a further embodiment of the invention.

FIG. 7 illustrates an exemplary third matching procedure according to a further embodiment of the invention, which describes a Matching optimization by word syllables. This embodiment applies a method from speech linguistic, concretely, a Porter-Stemmer algorithm. While originally aimed to reduce a word to its word 'base' (stemming), a side effect is the separation of words into its syllables. Even if single words are eventually not the same in both text data snippets t1, t1', the number of syllables most likely will be the same. Concretely, the applied method creates the number of syllables in the first text data snippet t1 and also in the second text data snippet t1'. The result is a number representation of the text data snippets like: . . . 2 4 3 1 6 8 . . . . Then, the sequence from the first text data snippet t1 will be searched for in the second text data snippet t1'. The length of the matching syllable pattern may be modified to improve the results.

In some embodiments, all of the above described matching procedures may also be combined or a subset of these procedures can be combined so as to achieve more accurate and reliable results.

FIG. 8 illustrates an exemplary optimization procedure with multiple transcription instances 2, 3, 4, and 5 according to an embodiment of the invention. It is noted that even if the very same audio stream transcription engines are used for transcription as outlined above, they may produce different results, therefore, by applying the 'matching' methods described above, identical texts in three text data snippets t1, t1', t1", etc. may be found. After this correlation parts of transcripts between those matches can be compared and bad transcriptions can be removed. A part of a transcript text data snippet is regarded as being correct if at least one other text data snippet has the same text at that location (referred to as 'quorum'). In FIG. 8, the matching areas for four transcription instances 2, 3, 4, 5 are shown. In each area, a quorum of at least two transcriptions is to be found, thus eliminating the transcription with the worst quality. Those quorum areas are matched with the matching procedure described above. It is noted that it is not necessary that the whole area matches, but the matching is used to correlate the text data snippets, i.e., move them on the time axis until they match.

Finally, it is noted that transcription engines from different vendors may be used to achieve the best transcription results as possible.

It should be appreciated that the different transcription instances can be components of a communication device or different communication devices incorporated into a teleconference service hosting server system or communicatively connected to such a server system. In some embodiments, the transcription instances can be pre-defined transcription program features run on at least one teleconference hosting server. Embodiments of the method can be utilized in conjunction with telecommunication services hosted via at least one network that facilitates a telecommunication connection between at least two participant devices (e.g. laptop computers, telephones, tablets, smart phones, etc.).

It should be appreciated that different embodiments of the method, system, and apparatus can be developed to meet different sets of design criteria. For example, the particular type matching procedure that is used can be selected to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a system, and methods of making and using the same have been shown and described above, it is to be distinctly understood that the invention is not limited thereto but may be otherwise variously embodied and practiced within the scope of the following claims.

What is claimed is:

1. A computer-implemented method of transcribing an audio stream comprises:

transcribing the audio stream using a first transcribing instance of a transcription service, the first transcribing instance having a first predetermined transcription size that is smaller than a total length of the audio stream, the first transcribing instance providing a plurality of consecutive first transcribed text data snippets of the audio stream, each of the first transcribed text data snippets having a size corresponding to the first predetermined transcription size;

transcribing the audio stream using at least a second transcribing instance having a second predetermined transcription size that is smaller than the length of the audio stream, the second transcribing instance providing a plurality of consecutive second transcribed text data snippets of the audio stream, each of the second transcribed text data snippets having a size corresponding to the second predetermined transcription size;

wherein the first transcribing instance starts transcription of the audio stream at a first point of time and the second transcribing instance starts transcription of the audio stream at a second point of time with a predetermined delay with respect to the first transcribing instance;

wherein the predetermined delay is selected such that each one of the plurality of second text data snippets overlaps with at least an ending portion of a respective first transcribed text data snippet of the plurality of the first text data snippets ends and also overlaps with a starting portion of the first transcribed text data snippet of the plurality of the first text data snippets that is consecutive to the respective first transcribed text data snippet;

identifying matching text passages in overlapping portions of the first and second transcribed text data snippets via at least one of:

identifying at least one word pattern in the first transcribed text data snippet, the at least one word pattern comprising at least two long words with a predetermined number of short words in between the two long words and, in response to the at least one word pattern being identified in the first transcribed text data snippet, searching the identified at least one word pattern in the second transcribed text data snippets; and identifying at least one syllable pattern according to a Porter-Stemmer algorithm in the first transcribed text data snippets and, in response to the at least one syllable pattern being identified in the first transcribed text data snippets, searching the identified at least one syllable pattern in the second transcribed text data snippets.

2. The computer implemented-method of claim 1, wherein the method further comprises:

transcribing the audio stream using a third transcribing instance, the third transcribing instance having a third predetermined transcription size that is smaller than the total length of the audio stream, the third transcribing instance providing a plurality of consecutive third transcribed text data snippets of the audio stream, a size of the third transcribed text data snippets corresponding to the third predetermined transcription size;

wherein the third transcribing instance starts transcription of the audio stream at a second point of time with a predetermined delay with respect to the second transcribing instance;

wherein the predetermined delay is selected such that each one of the plurality of third text data snippets respectively overlaps at least a portion at which a first transcribed text data snippet of the plurality of the first text data snippets ends and a consecutive first transcribed text data snippet of the plurality of the first text data snippets starts.

3. The computer-implemented method according to claim 1, wherein the transcription size of the first transcribing instance is equal to the transcription size of the second transcribing instance.

4. The computer-implemented method according to claim 1, wherein the identifying of the matching text passages also comprises:

identifying at least one word having a predetermined minimum length, and in response to the at least one word having the predetermined minimum length being identified in the first transcribed text data snippet, searching for the identified at least one word in the second transcribed text data snippets.

5. The computer-implemented method according to claim 4, comprising:

transcribing the audio stream using a third transcribing instance, the third transcribing instance having a third predetermined transcription size that is smaller than the total length of the audio stream, the third transcribing instance providing a plurality of consecutive third transcribed text data snippets of the audio stream, a size of the third transcribed text data snippets corresponding to the third predetermined transcription size;

wherein the third transcribing instance starts transcription of the audio stream at a second point of time with a predetermined delay with respect to the second transcribing instance;

wherein the predetermined delay is selected such that each one of the plurality of third text data snippets respectively overlaps at least a portion at which a first transcribed text data snippet of the plurality of the first text data snippets ends and a consecutive first transcribed text data snippet of the plurality of the first text data snippets starts; and in response to the at least one word having the predetermined minimum length being identified in the first transcribed text data snippet, searching the identified at least one word in the third transcribed text data snippets.

6. The computer-implemented method according to claim 4, wherein the identified matching words and/or text passages are correlated.

7. The computer-implemented method of claim 1, wherein wherein the predetermined delay is selected such that one of the second text data snippets overlaps with at least an ending portion of a the first snippet of the plurality of the first text data snippets and also overlaps with a starting portion of a the second snippet of the plurality of the first text data snippets.

8. The computer implemented-method of claim 7, wherein the method further comprises:

transcribing the audio stream using a third transcribing instance, the third transcribing instance having a third predetermined transcription size that is smaller than the total length of the audio stream, the third transcribing instance providing a plurality of consecutive third transcribed text data snippets of the audio stream, a size of the third transcribed text data snippets corresponding to the third predetermined transcription size;

wherein the third transcribing instance starts transcription of the audio stream at a second point of time with a predetermined delay with respect to the second transcribing instance;

wherein the predetermined delay is selected such that one of the plurality of third text data snippets overlaps with at least an ending portion of the first snippet of the plurality of the first text data snippets and also overlaps with a starting portion of the second snippet of the plurality of the first text data snippets.

9. A computer-implemented method of transcribing an audio stream comprising:

transcribing the audio stream using a first transcribing instance of a transcription service, the first transcribing instance having a first predetermined transcription size that is smaller than a total length of the audio stream, the first transcribing instance providing a plurality of consecutive first transcribed text data snippets of the audio stream, each of the first transcribed text data snippets having a size corresponding to the first predetermined transcription size;

transcribing the audio stream using at least a second transcribing instance having a second predetermined transcription size that is smaller than the length of the audio stream, the second transcribing instance providing a plurality of consecutive second transcribed text data snippets of the audio stream, each of the second transcribed text data snippets having a size corresponding to the second predetermined transcription size;

wherein the first transcribing instance starts transcription of the audio stream at a first point of time and the second transcribing instance starts transcription of the audio stream at a second point of time with a predetermined delay with respect to the first transcribing instance:

wherein the predetermined delay is selected such that each one of the plurality of second text data snippets overlaps with at least an ending portion of a respective first transcribed text data snippet of the plurality of the first text data snippets ends and also overlaps with a starting portion of the first transcribed text data snippet of the plurality of the first text data snippets that is consecutive to the respective first transcribed text data snippet;

concatenating the first transcribed text data snippets and the second transcribed text data snippets, the concatenating of the first and second transcribed text data snippets comprising identifying matching text passages in overlapping portions of the first and second transcribed text data snippets, wherein the identifying of the matching text passages comprises:

identifying at least one word pattern in the first transcribed text data snippet, the at least one word pattern comprising at least two long words with a predetermined number of short words in between the two long words, and in response to the at least one word pattern being identified in the first transcribed text data snippet, searching the identified at least one word pattern in the second transcribed text data snippets.

10. The computer-implemented method of claim 9, wherein the transcription service is a real-time transcription service or an Automatic Speech Recognition (ASR) service.

11. The computer-implemented method of claim 9, comprising:

displaying the transcribed audio stream via a display device.

12. A transcription mechanism for a communication system for carrying out a video and/or audio conference with at least two participants, wherein the transcription mechanism is adapted to carry out the method of claim 9.

13. A computer-implemented method of transcribing an audio stream comprising:

transcribing the audio stream using a first transcribing instance of a transcription service, the first transcribing instance having a first predetermined transcription size that is smaller than a total length of the audio stream, the first transcribing instance providing a plurality of consecutive first transcribed text data snippets of the audio stream, each of the first transcribed text data snippets having a size corresponding to the first predetermined transcription size;

transcribing the audio stream using at least a second transcribing instance having a second predetermined transcription size that is smaller than the length of the audio stream, the second transcribing instance providing a plurality of consecutive second transcribed text data snippets of the audio stream, each of the second transcribed text data snippets having a size corresponding to the second predetermined transcription size;

wherein the first transcribing instance starts transcription of the audio stream at a first point of time and the second transcribing instance starts transcription of the audio stream at a second point of time with a predetermined delay with respect to the first transcribing instance:

wherein the predetermined delay is selected such that each one of the plurality of second text data snippets overlaps with at least an ending portion of a respective first transcribed text data snippet of the plurality of the first text data snippets ends and also overlaps with a starting portion of the first transcribed text data snippet of the plurality of the first text data snippets that is consecutive to the respective first transcribed text data snippet;

concatenating the first transcribed text data snippets and the second transcribed text data snippets, the concatenating of the first and second transcribed text data snippets comprising identifying matching text passages in overlapping portions of the first and second transcribed text data snippets, wherein the identifying of the matching text passages comprises:

identifying at least one syllable pattern according to a Porter-Stemmer algorithm in the first transcribed text data snippets; and in response to the at least one syllable pattern being identified in the first transcribed text data snippets, searching the identified at least one syllable pattern in the second transcribed text data snippets.

14. The computer-implemented method according to claim 13, wherein the transcription service is a non real-time transcription service.

15. A transcription mechanism for a communication system for carrying out a video and/or audio conference with at least two participants, wherein the transcription mechanism is adapted to carry out the method of claim 13.

16. The computer-implemented method of claim 13, comprising: displaying the transcribed audio stream via a display device.

17. A transcription mechanism for a communication system for carrying out a video and/or audio conference with at least two participants, the transcription mechanism comprising:

a computer device having a processor connected to a non-transitory computer readable medium, the computer device positionable in a communication network and communicatively connectable to at least two participant communication devices of the at least two participants to a video and/or audio conference, the computer device configured to:

transcribe an audio stream of the video and/or audio conference using a first transcribing instance, the first transcribing instance having a first predetermined transcription size that is smaller than a total length of the audio stream, the first transcribing instance providing a plurality of consecutive first transcribed text data snippets of the audio stream, each of the first transcribed text data snippets having a size corresponding to the first predetermined transcription size;

transcribe the audio stream using at least a second transcribing instance having a second predetermined transcription size that is smaller than the length of the audio stream, the second transcribing instance providing a plurality of consecutive second transcribed text data snippets of the audio stream, each of the second transcribed text data snippets having a size corresponding to the second predetermined transcription size;

wherein the first transcribing instance is configured to start transcription of the audio stream at a first point of time and the second transcribing instance is configured to start transcription of the audio stream at a second point of time with a predetermined delay with respect to the first transcribing instance, predetermined delay being configured such that each one of the plurality of second text data snippets overlaps with at least an ending portion of a respective first transcribed text data snippet of the plurality of the first text data snippets ends and also overlaps with a starting portion of the first transcribed text data snippet of the plurality of the first text data snippets that is consecutive to the respective first transcribed text data snippet;

the computer device also configured to:

identify matching text passages in overlapping portions of the first and second transcribed text data snippets via at least one of:

identify at least one word pattern in the first transcribed text data snippet, the at least one word pattern comprising at least two long words with a predetermined number of short words in between the two long words and, in response to the at least one word pattern being identified in the first transcribed text data snippet, search the identified at least one word pattern in the second transcribed text data snippets; and identify at least one syllable pattern according to a Porter-Stemmer algorithm in the first transcribed text data snippets and, in response to the at least one syllable pattern being identified in the first transcribed text data snippets, search the identified at least one syllable pattern in the second transcribed text data snippets.

18. The transcription mechanism of claim 17, wherein the at least two participant communication devices comprises laptop computers, telephones, tablets, and/or smart phones.

* * * * *